(12) United States Patent
Matsushita (10) Patent No.: US 12,535,321 B2
(45) Date of Patent: Jan. 27, 2026

(54) DATA PROCESSING DEVICE AND DATA PROCESSING METHOD

(71) Applicant: Faurecia Clarion Electronics Co., Ltd., Saitama (JP)

(72) Inventor: Yuki Matsushita, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 165 days.

(21) Appl. No.: 18/238,024

(22) Filed: Aug. 25, 2023

(65) Prior Publication Data

US 2024/0068814 A1 Feb. 29, 2024

(30) Foreign Application Priority Data

Aug. 31, 2022 (JP) ................ 2022-138640

(51) Int. Cl.
| | | |
|---|---|---|
| *G01C 21/16* | (2006.01) | |
| *G06V 10/94* | (2022.01) | |
| *G06V 20/40* | (2022.01) | |
| *G06V 20/58* | (2022.01) | |
| *G06V 20/59* | (2022.01) | |
| *G06V 40/20* | (2022.01) | |
| *G10L 15/22* | (2006.01) | |

(52) U.S. Cl.
CPC ........... *G01C 21/16* (2013.01); *G06V 10/945* (2022.01); *G06V 20/41* (2022.01); *G06V 20/58* (2022.01); *G06V 20/59* (2022.01); *G06V 40/20* (2022.01); *G10L 15/22* (2013.01)

(58) Field of Classification Search
CPC ...... G06V 20/58; G06V 20/59; G06V 40/113; G01C 21/3697
USPC ......................................................... 701/488
See application file for complete search history.

(56) References Cited

U.S. PATENT DOCUMENTS

2014/0278068 A1* 9/2014 El Dokor ................ G06F 3/167
701/461

FOREIGN PATENT DOCUMENTS

JP 2007080060 A 3/2007

* cited by examiner

*Primary Examiner* — Navid Z. Mehdizadeh
*Assistant Examiner* — Vincent Feng
(74) *Attorney, Agent, or Firm* — Reising Ethington P.C.

(57) ABSTRACT

A data processing device and method that detect a location and direction of a vehicle, recognize an action by an occupant of the vehicle in the form of pointing outside the vehicle, estimate a likely designated region indicated by the occupant that is based on the recognition results and the vehicle location, recognize a target object candidate from the designated region indicated by the occupant; and output information regarding the target object candidate. The size of the designated region is differentiated based on the relationship between the direction pointed at by the occupant and the direction of the vehicle.

8 Claims, 6 Drawing Sheets

Fig. 1

Narrowing objects by a pointing direction and spoken contents

| | | |
|---|---|---|
| Static Features | Location | Map Database |
| | Type | Map Database Characteristics Database |
| | Appearance | Characteristics Database |
| | ⋮ | ⋮ |
| Dynamic Features | Queues | Image Recognition, Event Information |
| | Crowds | Image Recognition, Event Information |
| | Irregular Stop | Accident Information, Traffic Information |
| | Store Under Construction | New Store Information |
| | Store Changes | New Store Information |
| | ⋮ | ⋮ |

FIG. 6

(a) Pointing Gesture Recognition, Target Object Recognition (b) Target Object Tracking (c) Caputure/Output Image

DATA PROCESSING DEVICE AND DATA PROCESSING METHOD

CROSS REFERENCE TO RELATED APPLICATION

This patent application claims the benefit and priority of Japanese Patent Application No. 2022-138640, filed on Aug. 31, 2022, the disclosure of which is incorporated by reference herein in its entirety as part of the present application.

FIELD

The present invention relates to a data processing device and a data processing method.

BACKGROUND

Conventionally, there is a technology for identifying target objects pointed to by a user who is an occupant of a vehicle. For example, Patent Document 1 states, "a target object identifying device that accurately identifies a target object that exists in a direction to which a user's hand or finger is pointing is provided," and also states that "positioning unit 13 detects a current vehicle location and vehicle orientation. An imaging unit 18 captures an image of the surroundings of the vehicle. A pointing direction detection unit 16 detects a pointing direction pointed by the user in the vehicle using their hand. A target object extraction unit extracts target objects that exist in the indicated direction detected by the pointing direction detection unit 16 from the image captured by the imaging unit 18. The target object location identification unit identifies the location of the target object extracted by the target object extraction unit with respect to the vehicle." PATENT DOCUMENT 1: JP2007-080060A.

Conventional technology is premised on a high accuracy of a pointing direction so, unless the target object candidates can be accurately narrowed down to one, identifying the intended target object of the user was difficult. However, if the vehicle is traveling, even if the intent is to point at a target object located at a close distance such as stores or a long line along the roadway, the positional relation between the target object and the vehicle changes every second. Therefore, there are cases where there is deviation between the user's intended direction and the direction that the user actually points in. In addition, it is difficult to point at a place passed by a second time.

Accordingly, an object of the present application is to efficiently identify target objects intended by the user without depending on pointing accuracy of the user.

SUMMARY

According to one aspect of the present application, there is provided a data processing device installed in a vehicle, including: a vehicle location detecting unit that detects vehicle location and vehicle facing direction of the vehicle; an occupant recognition unit that recognizes actions of an occupant of the vehicle pointing outside the vehicle; an estimation unit that estimates a likely designated region indicated by the occupant; an object recognition unit that recognizes a target object candidate from the designated region indicated by the occupant; and an output unit that outputs information regarding the target object candidate. The estimation unit differentiates the size of the designated region based on the relationship between the direction pointed in by the occupant and the vehicle facing direction.

With the present application, target objects pointed to by an occupant of the vehicle can be efficiently identified. The following description of embodiments will elucidate the problems, configurations, and effects other than those described above.

EMBODIMENTS

Next, examples of the present application will be described using the drawings.

Figure 1:
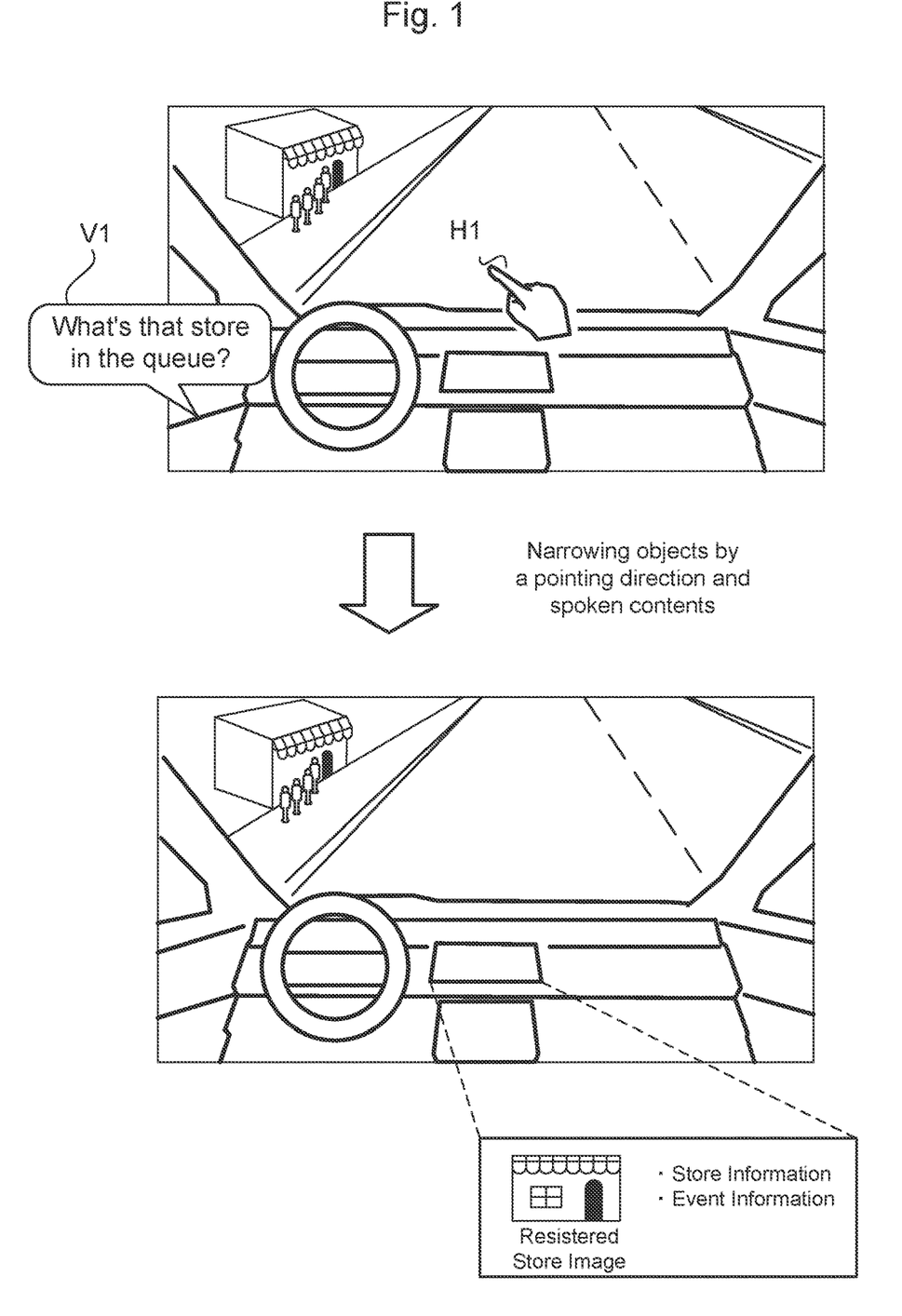
FIG. 1 is an explanatory diagram describing an overview of operation and action of a data processing device according to Example 1.
Figure 2:
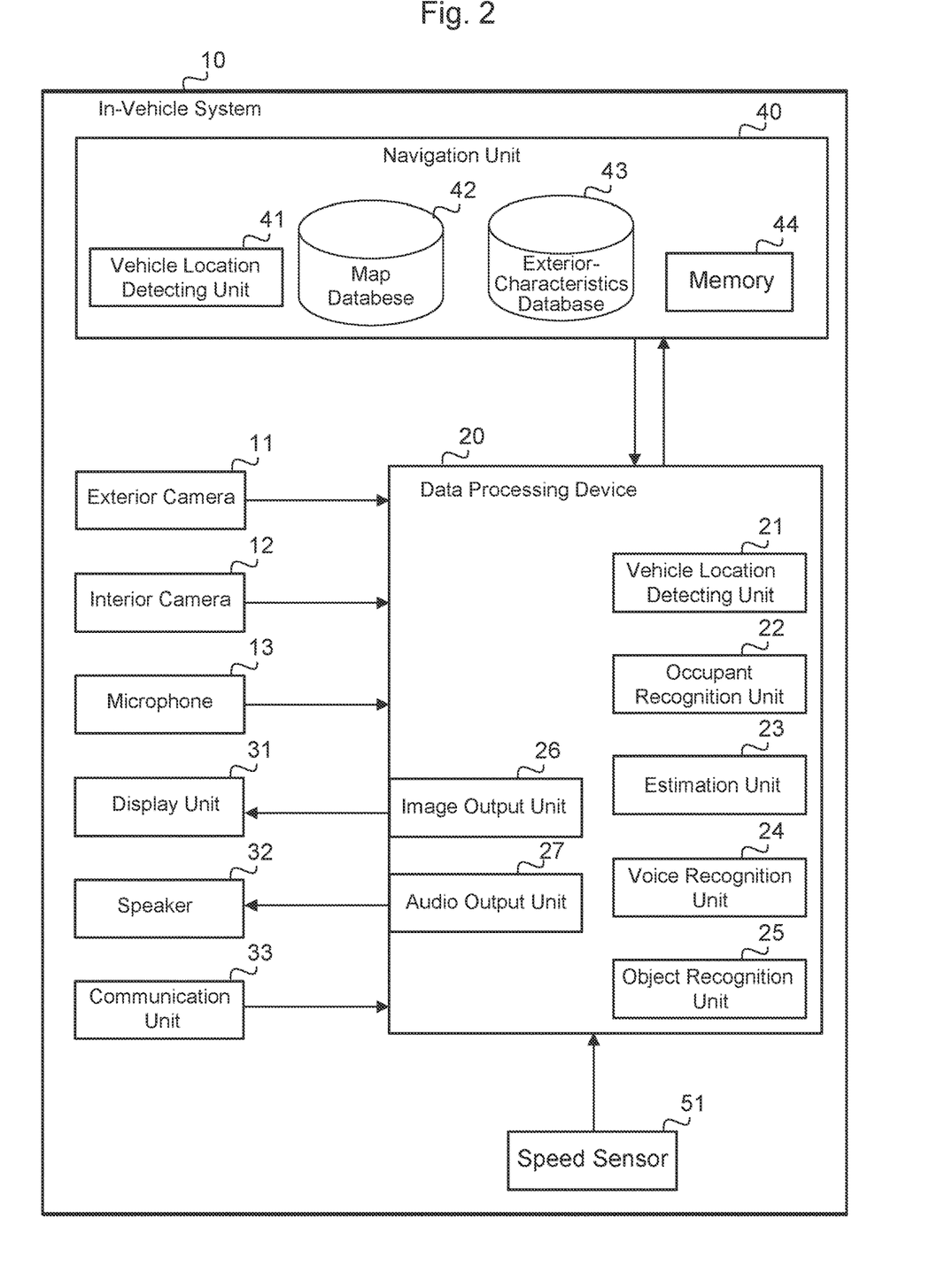
FIG. 2 is a configuration diagram of an overall in-vehicle system including the data processing device of Example 1.

(Example 1) FIG. 1 is an explanatory diagram describing an overview of operation and action of data processing according to Example 1. FIG. 1 shows a situation where a user, who is an occupant of a vehicle, is pointing outside the vehicle. FIG. 2 is a configuration diagram of an overall in-vehicle system including a data processing device 20 according to Example 1. The data processing device 20 provided in the vehicle is connected to an interior camera 12 that captures images of the interior of the vehicle and an exterior camera 11 that captures images of the surroundings of the vehicle.

The data processing device 20 acquires images from the interior camera 12, analyzes the images to identify the eye position and finger position of the occupant, and determines that a straight line connecting the eye position and fingertip is the pointing direction. Herein, the term "finger" is used to include at least one of a hand and/or a finger. However, there may be some error in the determination made by the data processing device 20, and since the occupant is driving, the pointing direction by the occupant may not always be accurate. In other words, there may be discrepancy between the pointing direction recognized by the data processing device 20 and the direction intended by the occupant. Therefore, the data processing device 20 sets a possible designated region pointed to by the occupant based on the pointing direction of the occupant.

The data processing device 20 references a map database 42 and sets an object located in the designated region as a candidate for the target object at which the occupant is pointing. In addition, the data processing device 20 recognizes the voice of the occupant and narrows down the object based on the voice content. In the situation of FIG. 1, the occupant points with a hand H1 and states with a voice V1 "What's that store in the queue?"

The data processing device 20 recognizes terms indicating characteristics of the object "store" and "queue" from the voice V1 and narrows down the candidates of the target object. As a result, if there is one candidate of the target object, the data processing device 20 outputs information regarding the target object candidate. In FIG. 1, a registered store image that is an image of the target object store registered in advance, store information such as the name of the store and introduction, and event information for the store is displayed on the display unit. If there are multiple target object candidates, the data processing device 20 displays brief information (for example, a registered store image for each target object or the like) side by side, accepts selection operation from the occupant, and outputs information regarding the selected target object.

In this manner, the data processing device 20 recognizes the target object using the results of the designated region set based on the recognized direction the occupant points in and speech recognition. However, when the vehicle is moving, it is difficult for the occupant to accurately indicate the target object. In addition, even if the vehicle is stopped, the driver basically has their focus forward for driving and the pointing direction toward a target object unrelated to driving may not be correct. Furthermore, in consideration that the vehicle is traveling and that the driver should have their focus forward, accuracy tends to be lower for when the driver is pointing backward of the vehicle rather than when the driver is pointing towards the front of the vehicle.

Therefore, the data processing device 20 efficiently determines the target object pointed at by the occupant by differentiating the size of the designated region based on the relationship of the recognized pointing direction pointed in by the occupant and the vehicle facing direction. Specifically, the data processing device 20 sets the size of the designated region for the case where the pointing direction is a backward side, based on the vehicle facing direction, as large as compared to the case where the pointing direction is a forward side, based on the vehicle facing direction. When the pointing direction is a backward side, the data processing device 20 can set the designated region larger as vehicle speed increases.

In addition, in the case where the direction that the occupant is pointing in is to the right backward side, based on the vehicle facing direction, the data processing device 20 can set the road surface within a predetermined distance to the right backward side as the designated region. Also, if the direction the occupant is pointing in is to the left backward side, the data processing device can set the road surface within a predetermined distance to the left backward side as the designated region. In this case, the data processing device 20 may set the predetermined distance farther with higher vehicle speeds.

In FIG. 2, the data processing device 20 is connected to a navigation unit 40 and speed sensor 51. The navigation unit 40 is a unit that searches for and guides the route of the vehicle. The navigation unit 40 has a vehicle location detecting unit 41, the map database 42, an exterior-characteristics database 43, and a memory unit 44.

The vehicle location detecting unit 41 receives, for example, a signal from an artificial satellite and detects location and facing direction of the vehicle. The map database 42 includes data on roads as well as the location and names of buildings, and the like. Therefore, the map database 42 can be used as a target object database that accumulates the location of target objects that may be pointed to by the occupant. The exterior-characteristics database 43 includes data indicating appearance features of the target object. Appearance features are indicated by the words the occupant uses to describe the building, such as tall, red, long, or the like. The exterior-characteristics database 43 may be integrated with the map database 42. The memory unit 44 stores information such as destinations and routes set by the occupant, setting history in the past, locations registered by instructions from the occupant.

The data processing device 20 is connected to the exterior camera 11, the interior camera 12, a microphone 13, a display unit 31, a speaker 32, and a communication unit 33. The exterior camera 11 is an imaging device that captures the images of the surroundings of the vehicle. The interior camera 12 is an imaging device that captures images of the vehicle interior and functions as a sensor to acquire the status of the occupant in the vehicle cabin. The microphone 13 collects sound in the cabin. An image output unit 26 outputs a video signal related to display for the occupant to the display unit 31. The display unit 31 may be configured with an input unit such as a touch panel display. An audio output unit 27 outputs an audio signal related to audio for the occupant to the speaker 32. The communication unit 33 is a wireless communication interface that connects to an external network.

The interior camera 12 is installed at a position where the eyes and hands of the occupant can be imaged. For example, the interior camera can be installed near the rear-view mirror or an interior light, or the like.

The data processing device 20 includes a vehicle location detecting unit 21, an occupant recognition unit 22, an estimation unit 23, a voice recognition unit 24, and an object recognition unit 25. When the data processing device 20 is implemented by means of a computer, functions corresponding to the occupant recognition unit 22, estimation unit 23, voice recognition unit 24, and object recognition unit 25 are implemented by a Central Processing Unit (CPU) executing a program.

The vehicle location detecting unit 21 detects vehicle location and vehicle facing direction of the vehicle. Specifically, vehicle location and vehicle facing direction are acquired from the vehicle location detecting unit 41 of the navigation unit 40.

The occupant recognition unit 22 acquires images captured by the interior camera 12 and recognizes the state of the vehicle occupant. The occupant state recognized by the occupant recognition unit 22 includes actions of pointing outside of the vehicle. The occupant recognition unit 22 recognizes the position of the eyes and the position of the hands of the occupant to recognize the action of the occupant pointing to outside the vehicle.

The estimation unit 23 estimates a designated region that is likely indicated by the occupant based on the recognition results by the occupant recognition unit 22 and the vehicle location. Herein, the estimation unit 23 differentiates the size of the designated region based on the relationship between the direction the occupant is pointing in and the vehicle facing direction.

As an example, the estimation unit 23 sets the size of the designated region as larger for the case where the direction the occupant is pointing in is a backward side, based on the vehicle facing direction, than for the case where the direction the occupant is pointing in is a forward side, based on the vehicle facing direction. Furthermore, in case the pointing direction is a backward side, the estimation unit 23 may reference the output of the speed sensor 51 and set the designated region larger with higher vehicle speeds.

As another example, in the case where the pointing direction is to the right backward side, based on the vehicle facing direction, the estimation unit 23 can set the road surface within a predetermined distance to the right backward side as the designated region. Also, if the pointing direction is to the left backward side, based on the vehicle facing direction, the estimation unit can set the road surface within a predetermined distance to the left backward side as the designated region. The estimation unit 23 may further reference the output of the speed sensor 51 and set the predetermined distance to be larger with higher vehicle speeds.

Arbitrary criteria can be used to distinguish between the forward side and the backward side of the vehicle. For example, the forward side can be set or determined if within the range of the windshield and the backward side can be set or determined otherwise. In the case where the occupant points at a target object through a side surface window of the vehicle, the location of the target object at that point is to the side with respect to the vehicle facing direction but as the vehicle travels, the target object moves relatively to a location behind the vehicle. In consideration of this point, when distinguishing the pointing direction between forward and backward sides, everything outside of the windshield range may be set to the backward side.

The voice recognition unit 24 recognizes words and phrases included in the voice of the occupant. Recognized words and phrases are those indicating static features and dynamic features of the object. Static features include, for example, the location of the object, the type of object (such as a store), the appearance, and the like. A dynamic feature is a temporally occurring feature that the occupant can recognize based on viewing. For example, queues, crowds, irregular stops, stores under construction, store changes (new opening, renovation), and the like, correspond to dynamic features.

The object recognition unit 25 recognizes target object candidates from the designated region pointed at by the occupant. Specifically, the object recognition unit 25 references the map database 42 based on vehicle location and vehicle facing direction and extracts target object candidates located within the designated region. Furthermore, the object recognition unit 25 narrows down the target object candidates with the features indicated by words and phrases as conditions.

As a result of narrowing down, if there is one target object candidate, a signal displaying information related to the target object candidate is output to the display unit 31 from the image output unit 26 connected to the display unit 31. Information regarding the target object candidates may include arbitrary information such as a store name, type, open hours, introductory text, event information, and the registered store image, and the like. Information registered in the map database 42 or exterior-characteristics database 43 is used as this information. Alternatively, information obtained from outside via the communication unit 33 may be provided.

If there are multiple target object candidates, the display unit 31 displays brief information of the target objects (for example, the registered store image of each target object) side by side, and receives selection operation from the occupant. In response to this selection operation, the display unit 31 displays detailed information related to the selected target object.

Figure 3:
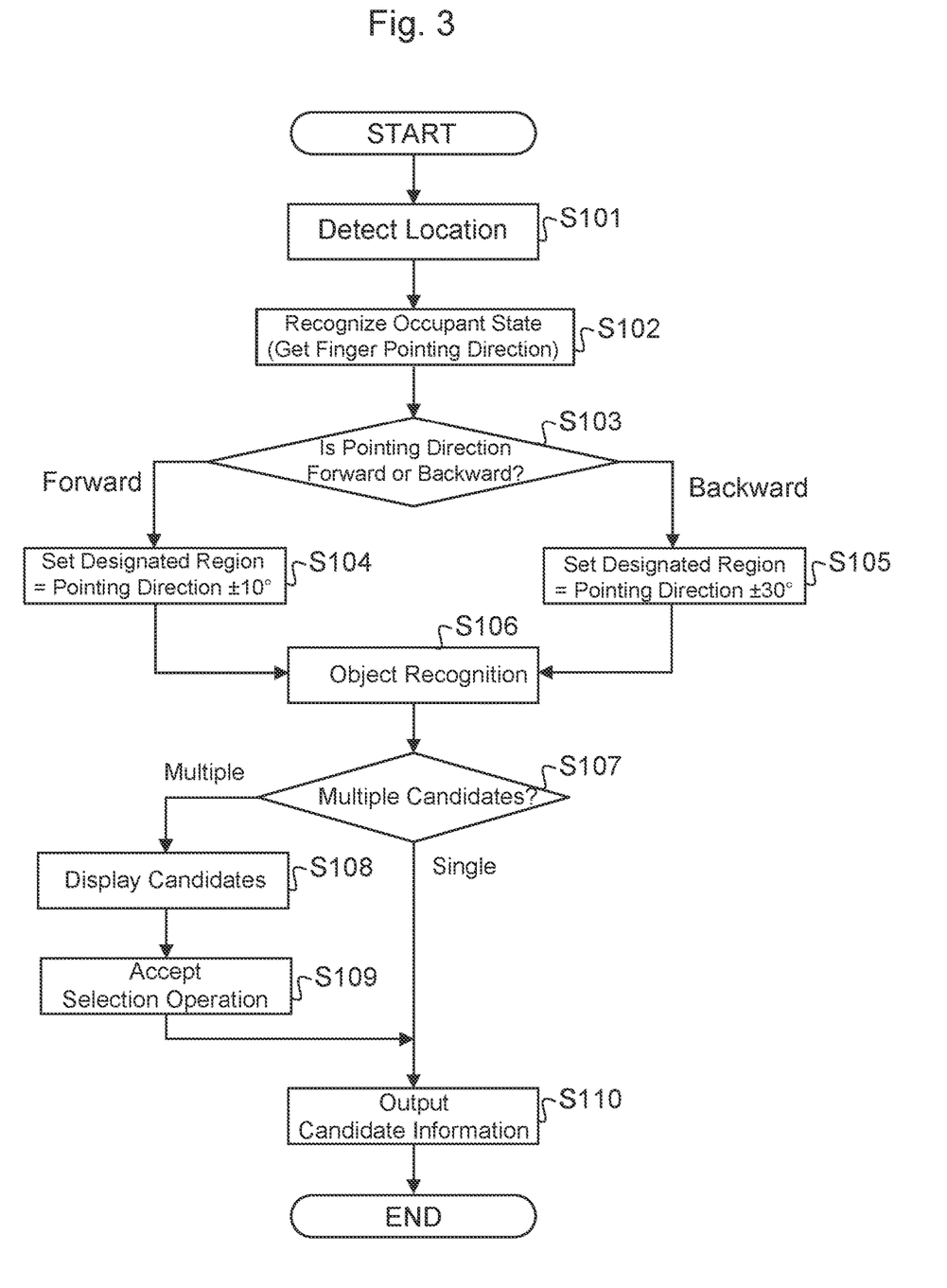
FIG. 3 is a flowchart showing a process operation of the data processing device.

FIG. 3 is a flowchart showing the process operation of the data processing device 20. First, the vehicle location detecting unit 21 performs location detection by acquiring the location and facing direction of the vehicle from the navigation unit 40 (step S101).

The occupant recognition unit 22 recognizes the state of the occupant using imaging results of the interior camera 12 and acquires the pointing direction (step S102). The estimation unit 23 determines whether the pointing direction is towards the forward side or backward side of the vehicle (step S103). If it is towards the forward side, the estimation unit 23 sets the designated region to a range of ±10° based on the pointing direction (step S104). If it is towards the backward side, the estimation unit 23 sets the designated region to a range of ±30° based on the pointing direction (step S105).

After the estimating steps of step S103 to S105, the object recognition unit 25 recognizes target object candidates from the designated region that the occupant pointed at (step S106). Words or phrases recognized by the voice recognition unit 24 can be used for recognizing the target object candidates.

After step S106, the object recognition unit 25 determines whether there are multiple candidates or a single candidate (step S107). If there are multiple candidates, the display unit 31 displays the multiple candidates side by side (step S108). Furthermore, selection by the occupant is received (step S109).

After step S109 or in the case where there was a single candidate in step S107, the display unit 31 outputs the candidate information (step S110) and closes processing.

Figure 4:
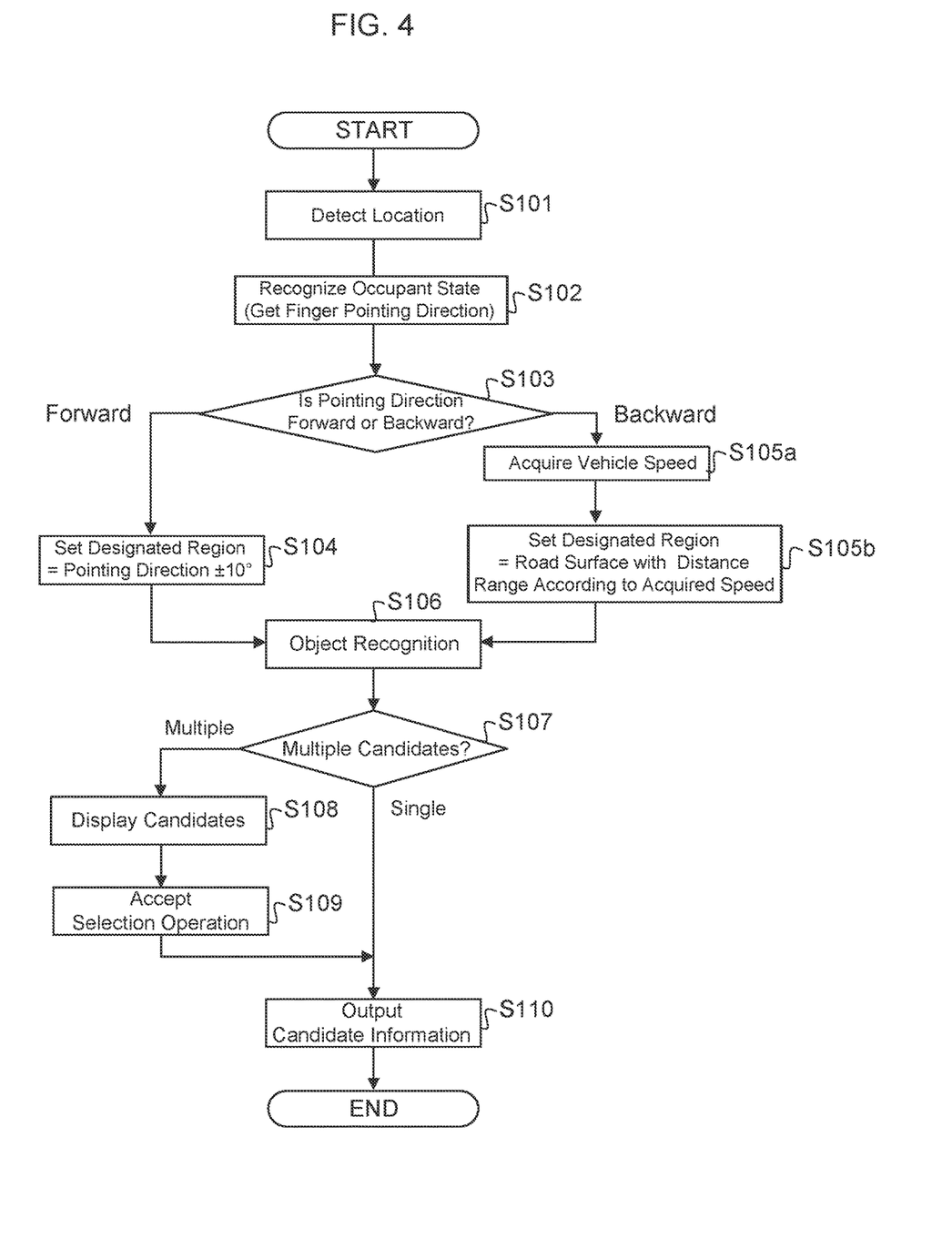
FIG. 4 is a flowchart showing another process operation of the data processing device.

FIG. 4 is a modified example of a flowchart showing the process operation of the data processing device 20. In FIG. 4, operation of step S105 of FIG. 3 is replaced with step S105a and step S105b. The other steps are the same as FIG. 3 so the description thereof is omitted.

In step S105a, the estimation unit 23 acquires vehicle speed from the speed sensor 51. Thereafter, the estimation unit 23 sets the designated region on the road surface with a distance range according to the speed (step S105b). In this manner, the designated region is set to a predetermined distance range and the distance range is set according to speed.

Note that in FIG. 4, an example where the predetermined distance range is changed according to speed was depicted; however, speed may also be considered in the processing operation indicated in FIG. 3. For example, if the pointing direction is towards the backward side and the threshold is less than the threshold, a range of ±30° based on the pointing direction can be set as the designated region. On the other hand, if the pointing direction is towards the backward side and the speed is at or above the threshold, a range of ±45° based on the pointing direction can be set as the designated region. In another example, if the pointing direction is towards the backward side and the threshold is less than the threshold, a range of ±30° based on the pointing direction can be set as the designated region. On the other hand, if the pointing direction is towards the backward side and the speed is at or above the threshold, the designated region can be set to the road surface of a predetermined distance range.

Figure 5:
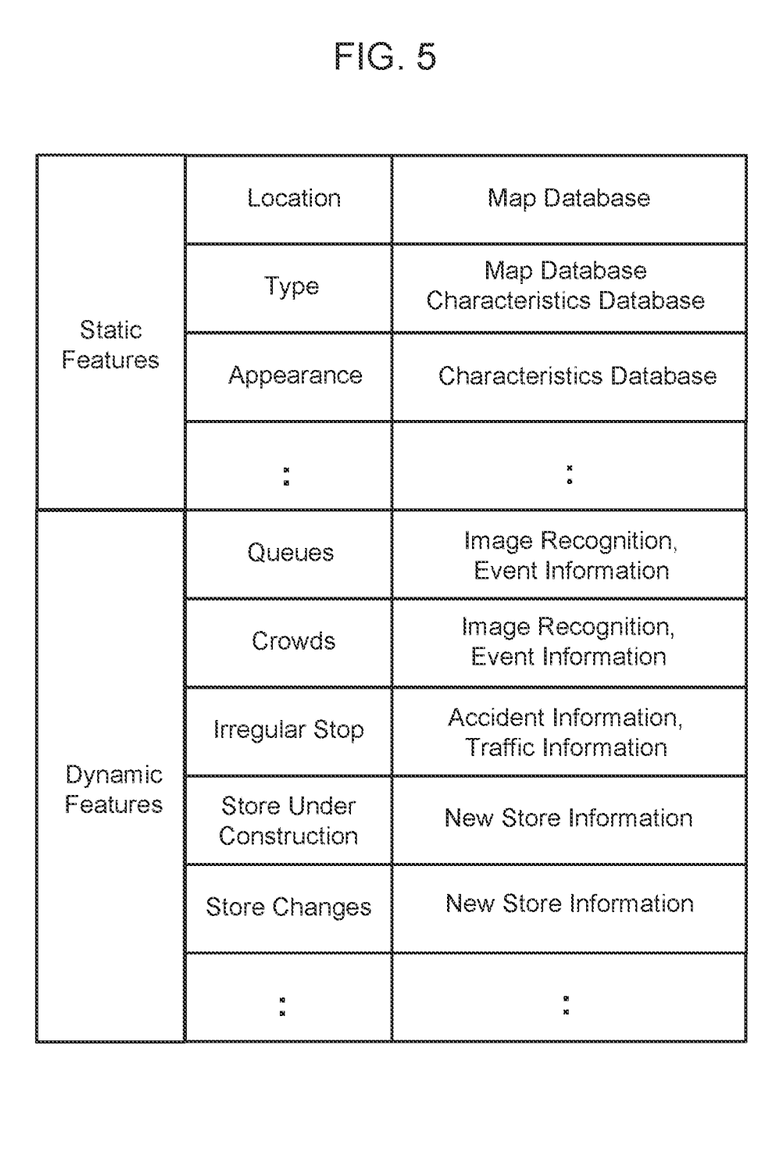
FIG. 5 is an explanatory diagram of the features of the target object.

Next, the features of the target object will be described. FIG. 5 is an explanatory diagram of the features of the target object. Target object features include static features and dynamic features. Static features include, for example, the location of the target object, the type of target object (such as a store), the appearance, and the like. The location of the target object can be obtained from the map database 42. The type of target object can be obtained from the map database 42 or exterior-characteristics database 43. An arbitrary word or phrase can be used to separate the target objects such as stop, bakery, restaurant, or the like. The appearance of the target object can be obtained from the exterior-characteristics database 43.

A dynamic feature is a temporally occurring feature that the occupant can recognize based on viewing. For example, queues, crowds, irregular stops, store under construction, store changes (new opening, renovation), and the like, correspond to dynamic features.

A long line can be determined by image recognition. In addition, occurrence of a long line may be estimated by accessing the internet or the like via the communication unit 33 and acquiring event information. In a similar manner, estimating crowding is feasible based on determining through image recognition and event information.

An irregular stopped vehicle is when another vehicle that is stopped due to an accident or work is discovered. Irregular stopped vehicles can be determined by accessing the internet or the like via the communication unit 33 and acquiring accident information or traffic information.

A store or the like being under construction is a state of discovering a store under construction at that time. A store or the like being under construction may be determined by accessing the internet or the like via the communication unit 33 and acquiring new store information or the like. A change of a store or the like is newly opening, renovation, or the like where the appearance of the target object is changed from before. Changes to a store or the like may be determined by accessing the internet or the like via the communication unit 33 and acquiring new store information or the like.

Next, image display of the target object is described. When the data processing device 20 displays an image of the target object on the display unit 31, a preregistered image may be displayed, otherwise an image captured by the exterior camera 11 may be displayed.

When an image captured by the exterior camera 11 is displayed, if an image from the instant the occupant pointed is used, the data processing device 20 can provide an image close to that seen by the occupant. However, the image at the instant the occupant points is not necessarily always suitable. In particular, if the occupant points forward, the exterior camera 11 captures an image from an oblique direction relative to the target object and so tends to have a reduced amount of information compared to an image from the front surface of the target object. Therefore, after the object recognition unit 25 recognizes the target object as a candidate, the data processing device 20 may output an image captured when the vehicle and the target object candidate achieve a predetermined positional relation to the display unit 31.

Figure 6:
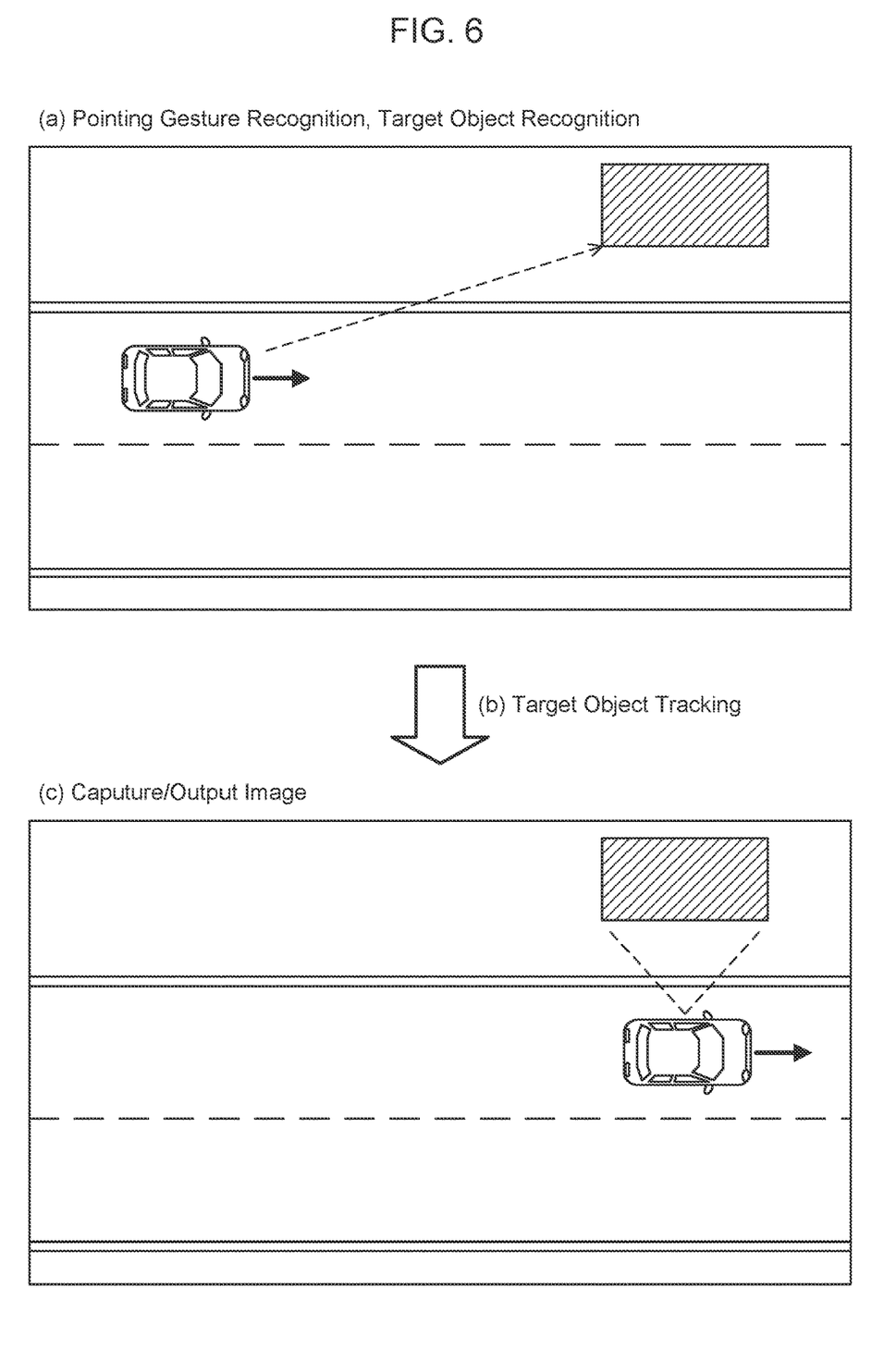
FIG. 6 is an explanatory diagram of a specific example of imaging a target object.

FIG. 6 is an explanatory diagram of a specific example of imaging a target object. First, the data processing device 20 recognizes the operation of the occupant pointing towards the target object and recognizes the target object candidate (a). Thereafter, the data processing device 20 tracks the relative position of the target object (b), and an image captured by the exterior camera 11 when the target object reaches the side of the vehicle, in other words, when the vehicle reaches the front surface of the target object, is displayed on the display unit 31 (c). Specifically, images captured by the exterior camera 11 are continuously accumulated, the location of the target object is tracked using image processing, and when the vehicle reaches the front surface of the target object, the image can be extracted and displayed.

As has been described above, the disclosed data processing device 20 includes: a vehicle location detecting unit 21 that detects a vehicle location and a vehicle facing direction of the vehicle; an occupant recognition unit 22 that recognizes actions of an occupant of the vehicle pointing outside the vehicle; an estimation unit 23 that estimates a likely designated region indicated by the occupant; an object recognition unit 25 that recognizes a target object candidate from the designated region indicated by the occupant; and an image output unit 26 or audio output unit 27 as an output unit that outputs information regarding the target object candidate; wherein the estimation unit 23 differentiates the size of the designated region based on the relationship between the direction pointed in by the occupant and the vehicle facing direction. With this configuration and operation, the target object intended by the user can be efficiently identified without depending on pointing accuracy by the user.

In the case that the object recognition unit 25 recognizes multiple target object candidates in the designated region, the multiple candidates are presented to the occupant and the output unit outputs information regarding the candidate of the multiple candidates selected by the occupant. Therefore, uniquely specifying a target by sufficiently narrowing down to multiple candidates and receiving a selection by the occupant.

The estimation unit 23 sets the size of the designated region for the case where the direction pointed in by the occupant is towards the backward side, based on the vehicle facing direction, to be larger than that for the case where the direction pointed in by the occupant is towards the forward side, based on the vehicle facing direction. Herein, in the case where the direction pointing to by the occupant is the backward side direction, the estimation unit 23 increases the size of the designated region as the speed of the vehicle increases. Therefore, premised on the vehicle traveling forward and the occupant being basically focused forward, target objects can be identified efficiently.

In case the direction that the occupant is pointing in is to the right backward side, based on the vehicle facing direction, the estimation unit 23 can set the road surface within a predetermined distance to the right backward side as the designated region. Also, if the direction the occupant is pointing in is to the left backward side, the estimation unit can set the road surface within a predetermined distance to the left backward side as the designated region. Herein, the estimation unit 23 can increase the predetermined distance as the speed of the vehicle increases. Therefore, premised on the vehicle traveling forward and the occupant being basically focused forward, target objects can be identified efficiently.

A voice recognition unit 24 that recognizes words and phrases included in the voice of the occupant is further provided and the object recognition unit 25 recognizes target object candidates with the feature indicated by the word or phrase and that is located in the designated region. Therefore, the target object can be efficiently identified using what is spoken by the occupant. The words and phrases can be recognized based on what is seen by the occupant and are temporally occurring features. Therefore, the target object can be efficiently identified using features that appear temporarily.

After the object recognition unit recognizes the target object candidate, the image output unit 26 outputs a video signal including an image captured when the vehicle and the target object candidate reach a predetermined positional relation to the display unit 31. Therefore, an image with favorable visibility and that has a lot of information can be displayed for the target object.

Note that the present invention is not limited to the abovementioned examples and includes various modifications. For example, while the abovementioned examples have been described in detail in order to describe the present invention in an easy-to-understand manner, the present invention is not necessarily limited to those with all the described configurations. Moreover, not only the deletion of such configurations, but also the replacement or addition of configurations is possible.

For example, if there are other occupants besides the driver, the present invention may be applied to the other occupants. A specific occupant among the multiple occupants may also be designated as the occupant to whom the present invention is applied.

The status of the occupant may also be acquired from an arbitrary sensor other than the interior camera, such as LIDAR (Light Detection and Ranging, Laser Imaging Detection and Ranging), a stationary smartphone, or the like. The output of a multiple sensors or multiple types of sensors may be combined for use.

Furthermore, in the example described above, a line extending from the eyes and fingertips was determined as the direction in which the occupant is pointing, but it is also possible to recognize two points on the fingers and determine that a line extending between these two points is the direction in which the occupant is pointing.

In the example described above, the data processing device 20 acquired various types of information using the navigation unit 40 but may acquire various types of information from an external server connected by a network.

The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

DESCRIPTION OF REFERENCE NUMERALS

10. In-vehicle system, 11. Exterior camera, 12. Interior camera, 13. Microphone, 20. Data processing device, 21. Vehicle location detecting unit, 22. Occupant recognition unit, 23. Estimation unit, 24. Voice recognition unit, 25. Object recognition unit, 26. Image output unit, 27. Audio output unit, 31. Display unit, 32. Speaker, 33. Communication unit, 40. Navigation unit, 41. Vehicle location detecting unit, 42. Map database, 43. Exterior-characteristics database, 44. Memory unit, 51. Speed sensor, 60. Server

The invention claimed is:

1. A data processing device installed in a vehicle, comprising:
a vehicle location detecting unit that detects a location and a direction of the vehicle and provides a signal;
an occupant recognition unit that recognizes an action of an occupant of the vehicle pointing to outside of the vehicle and provides a signal;
an estimation unit coupled to the vehicle location detecting unit and the occupant recognition unit, the estimation unit estimates a likely designated region indicated by the occupant based on the recognition results of the occupant recognition unit and the vehicle location;
an object recognition unit that recognizes a target object candidate from the designated region indicated by the occupant; and
an output unit that outputs information regarding the target object candidate;
wherein the estimation unit
estimates a first region as the designated region based on the direction pointed in by the occupant when the direction pointed in by the occupant is forwards, based on the direction of the vehicle, and
estimates a second region as the designated region based on the direction pointed in by the occupant when the direction pointed in by the occupant is backwards, based on the direction of the vehicle, and
wherein the second region is larger than the first region which is estimated as the designated region when the direction pointed in by the occupant is forwards, based on the direction of the vehicle.

2. The data processing device according to claim 1, wherein,
the object recognition unit presents multiple candidates to the occupant when there are a multiple target object candidates in the designated region, and
the output unit outputs information regarding the candidate selected by the occupant out of the multiple candidates.

3. The data processing device according to claim 1, wherein,
the estimation unit increases the size of the designated region as the speed of the vehicle increases when the direction pointing to by the occupant is backwards.

4. The data processing device according to claim 1, wherein,
the estimation unit sets the road surface of a right backward side within a predetermined distance as the designated region when the occupant points to the right backward side, based on the direction of the vehicle, and the estimation unit sets the road surface of a left backward side within a predetermined distance as the designated region when the occupant points to the left backward side, based on the direction of the vehicle.

5. The data processing device according to claim 4, wherein,
the estimation unit increases the predetermined distance as the speed of the vehicle increases.

6. The data processing device according to claim 4, wherein,
the output unit outputs a video signal including an image captured when a positional relation between the vehicle and the target object candidate becomes a predetermined condition after the object recognition unit recognizes the target object candidate.

7. The data processing device according to claim 1, further comprising:
a voice recognition unit for recognizing words included in a voice of the occupant;
wherein, the object recognition unit recognizes a target object candidate located in the designated region having a feature indicated by the words.

8. A data processing method executed in a data processing device installed in a vehicle, comprising the steps of:
- detecting a location and direction of the vehicle and providing a signal representative of the vehicle location and the vehicle direction;
- recognizing an action of an occupant of the vehicle pointing outside the vehicle and providing a signal representative of the recognition results;
- estimating a likely designated region indicated by the occupant based on the recognition results in the signal provided during the recognizing step and the vehicle location in the signal provided during the detecting step;
- recognizing a target object candidate from the designated region indicated by the occupant; and
- outputting information regarding the target object candidate;
- wherein the estimating step
  - estimates a first region as the designated region based on the direction pointed in by the occupant when the direction pointed in by the occupant is forwards, based on the vehicle direction, and
  - estimates a second region as the designated region based on the direction pointed in by the occupant when the direction pointed in by the occupant is backwards, based on the vehicle direction, and
  - wherein the second region is larger than the first region which is estimated as the designated region when the direction pointed in by the occupant is forwards, based on the vehicle direction.

* * * * *